United States Patent

[11] 3,554,068

| | | |
|---|---|---|
| [72] | Inventor | Hermann Schwartz<br>Adliswil, Switzerland |
| [21] | Appl. No. | 753,447 |
| [22] | Filed | Aug. 19, 1968 |
| [45] | Patented | Jan. 12, 1971 |
| [73] | Assignee | Siegfried Peyer<br>Bach, Switzerland |
| [32] | Priority | Aug. 23, 1967 |
| [33] | | Switzerland |
| [31] | | No. 11820/67 |

[54] APPARATUS FOR CUTTING A STRAND OF MATERIAL
6 Claims, 4 Drawing Figs.

[52] U.S. Cl. .................................................. 83/561,
83/566, 83/575, 83/659
[51] Int. Cl. ...................................................... B26d 1/08
[50] Field of Search ........................................... 83/561,
659, 566, 575, 649

[56] References Cited
UNITED STATES PATENTS

| 113,618 | 4/1871 | Bigelow .................... | 83/659X |
| 489,435 | 1/1893 | Hotchkiss ................... | 83/575X |
| 1,676,260 | 7/1928 | Glidden ....................... | 83/561X |
| 1,942,069 | 1/1934 | Setoguchi et al. ........... | 83/575X |
| 2,552,958 | 5/1951 | Graham et al. .............. | 83/542X |
| 3,176,555 | 4/1965 | Bowker et al. ............... | 83/659X |

*Primary Examiner*—Andrew R. Juhasz
*Assistant Examiner*—Leon Gilden
*Attorney*—Werner W. Kleeman ABSTRACT: There is disclosed an apparatus for cutting a through passing lengthwise displaceable strand of material, especially a textile yarn, which incorporates a displaceably guided cutting knife means having a cutting edge portion. An anvil body means providing an anvil surface is rotatably mounted in a position to cooperate with the cutting knife means. The anvil body means is formed of a material possessing less hardness than the material forming the cutting edge portion. Drive means serve to advance the cutting knife means with its cutting edge portion against the anvil surface. The rotatably mounted anvil body means is contacted by the lengthwise displaceable strand of material in such a way that during each cutting operation the anvil body means carries out a partial rotational movement in order to expose a different portion of the anvil surface for the next cutting operation.

PATENTED JAN 12 1971

3,554,068

INVENTOR
HERMANN SCHWARTZ

BY Jacobi & Davidson

ATTORNEYS

APPARATUS FOR CUTTING A STRAND OF MATERIAL

BACKGROUND OF THE INVENTION

The present invention relates to an improved apparatus for the cutting or severing of a throughpassing, lengthwise displaceable strand of material, in particular a textile yarn, by means of a displaceably guided cutting knife or blade, wherein drive means serve to advance such cutting knife with its cutting edge against an anvil surface, the material forming the anvil possessing less hardness than the cutting material.

Cutting devices of this type, for instance, are employed in conjunction with electronic yarn cleaners in order to carry out a severing or cutting operation whenever the measuring filed or zone of the yarn cleaner has determined a yarn defect, for instance, a thickened portion of the yarn, at the throughpassing yarn which should be cut out. So that the throughpassing strand of material can be smoothly cut or severed, it is necessary to carry out a rapid or instantaneous cutting motion of the cutting knife or the like. Generally, an electromagnet is employed as the drive means for the cutting knife or the like. The armature of the electromagnet is in operable working relationship with the cutting knife which is displaceably guided transverse to the cutting edge thereof.

Physical constructions are known to the art in which the material of the anvil surface possesses the same hardness or a greater hardness than the cutting material, in that, for instance, the cutting edge and the anvil are fabricated from hardened or tempered steel. However, depending upon the cross section and the material of the strand which is to be severed, considerable cutting forces are to be used which, in the mentioned situation, leads to a rapid wear or destruction of the cutting edge. Consequently, steps were taken to manufacture the anvil surface from a softer material, brass for instance. However, due to the repeated impact of the harder cutting edge, a furrow or notch formed in such a soft anvil surface after a relatively short period of use. Such furrow or notch tended to become deeper and deeper during each cutting operation and continued to more and more impair the cutting operation, although the sharpness or honing of the cutting edge remained. It should be quite evident that the repeated exchange of the cutting apparatus or device or individual components thereof is highly undesirable since, each time, this requires an interruption in the operation or down time at the textile machine.

SUMMARY OF THE INVENTION

Accordingly, it is a primary object of the present invention to provide an improved apparatus for cutting or severing material strands which effectively overcomes or minimizes, at the very least, the drawbacks of the aforementioned prior art constructions.

Another, more specific object of the present invention is to provide an improved cutting apparatus for strands of material, especially textile yarns, employing a cutting edge which is harder than the cooperating surface of the anvil, and wherein the cutting apparatus can operate faultlessly without maintenance for longer periods of time and, advantageously retains its cutting capability over several hundred thousand actuations of the cutting apparatus.

Still a further significant object of the present invention relates to an improved apparatus for the severing of strands of material which is capable of providing a clean, quick cut at the material, retains its cutting capabilities for an exceptionally long period of time without maintenance, thereby necessitating less down time at the associated textile machine than was usually required with prior art structures.

A further significant object of the present invention is to provide an improved cutting apparatus of the previously mentioned type wherein the anvil surface of an anvil body member which cooperates with the cutting edge of a cutting knife or the like is rotated during each cutting operation by the travelling strand of material in order to expose a different portion of the anvil surface for the next cutting operation.

Now, in order to implement these and still further objects of the invention, which will become more readily apparent as the description proceeds, the inventive apparatus for the severing or cutting of a throughpassing strand of material is generally manifested by the features that the anvil surface is formed by an anvil body which is rotatably mounted in such a way that it carries out a partial rotational movement during each cutting operation owing to contact of the lengthwise displaceable material strand with the anvil body.

BRIEF DESCRIPTION OF THE DRAWING

The invention will be better understood, and objects other than those set forth above, will become apparent, when consideration is given to the following detailed description thereof.

DESCRIPTION OF THE PREFERRED EMBODIMENTS

Figure 1:
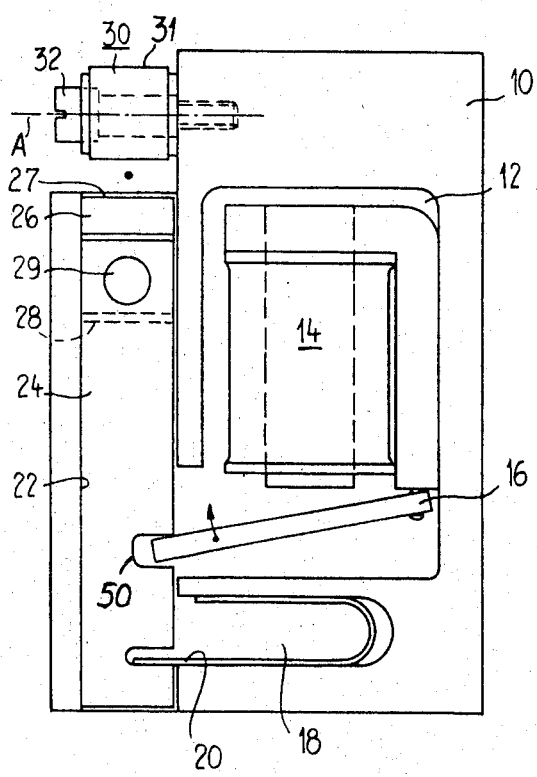
FIG. 1 is a schematic plan view of a first embodiment of inventive cutting apparatus.
Figure 2:
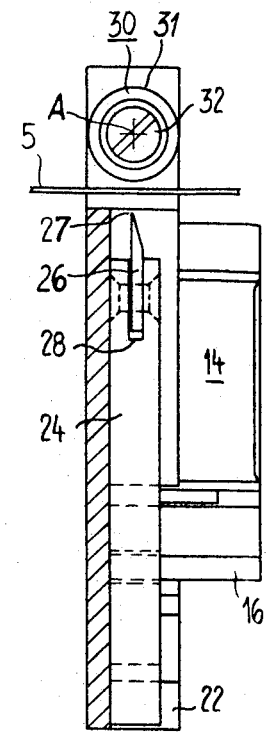
FIG. 2 is a side view, partially in section, of the cutting apparatus shown in FIG. 1.

Describing now the drawing, the exemplary illustrated embodiment of inventive cutting apparatus according to FIGS. 1 and 2 incorporates a base plate 10. A cutting element support means 24 is mounted to be lengthwise displaceable in a guide groove 22 of the base plate 10. As shown, at one end of the support means 24 there is inserted a suitable cutting element, such as the cutting knife or blade 26. The front edge of the cutting knife 26, preferably formed of hardened steel, is ground to provide a cutting edge portion 27. In order to preserve clarity in illustration the holding or retaining element which prevents the cutting knife 26 from falling out of the guide groove 22, has been conveniently omitted.

Now, in order to drive or displace the cutting knife 26 an electromagnet 14 is arranged in a recess 12 of the base plate 10. This electromagnet 14 embodies a pivotable armature 16 which engages with a recess 50 provided at the cutting knife support means 24, as best shown by referring to FIG. 1. Consequently, by actuation of the electromagnet 14 the support means 24 and therefore also the cutting knife 26 with its cutting edge portion 27 can be appropriately displaced to carry out the desired cutting operation of the material strand. In order to be able to retract the cutting knife 26 and the knife support means 24 after each cutting movement has been completed, and further in order to displace the armature 16 back into its illustrated starting position, there is advantageously provided a substantially U-shaped flexed blade or leaf spring 20 which is inserted in a further recess 18 of the base plate 10.

In the exemplary embodiment a cylindrical anvil body member or means 30 is arranged opposite the cutting edge portion 27. The strand of material 5 which is to be cut through, for instance a textile yarn, a fabric band or the like, passes between the cutting knife 26 and this anvil body member 30. Continuing, it will be seen that the cylindrical anvil body member 30 is seated upon a tight-fit screw 32 or equivalent structure which has been threaded into the base plate 10, and therefore is rotatable at this screw 32 about its longitudinal or lengthwise axis A. The material from which the anvil body member 30 is formed is softer than the cutting material, in other words softer than at least the cutting edge portion 27. Materials suitable for forming the anvil body member 30 are, for instance, brass, unhardened or untempered steel or plastic, by way of example.

It should also be understood that the axis of rotation A of the anvil body member 30 is situated parallel to the cutting edge portion 27 and is disposed in its plane of movement, so that the cutting edge portion 27 during each cutting movement impacts against the generatrix or surface line of the anvil body member 30, defining a body of rotation, which is situated in each case closest to and opposite the cutting edge portion 27. Furthermore, the lengthwise displaced yarn 5 always prior to the severing operation comes into contact with the jacket or peripheral surface 31 of the anvil body member 30, so that the latter is subjected to a greater or smaller partial rotation. In other words, the anvil body member is subjected to a partial irregular rotational movement. Consequently, the entire peripheral or jacket surface 31 of the anvil body member 30 is rendered available as an anvil surface. Due to the aforementioned rotational movements of this anvil body member 30 always new locations or generatrices of the cylindrical surface come into an effectual position, so that the fine depressions or notches formed by the cutting edge portion 27 are gradually distributed with time about the periphery of the anvil body member 30. Consequently, there is effectively prevented that any given location of the anvil surface 31 will be cut deeper and deeper because of repeated contact by the cutting edge portion 27. Quite to the contrary, the entire anvil surface is uniformly subjected to the action of the cutting knife 26, so that the cutting capability of the cutting apparatus is retained for a large number of cutting operations. There will only occur a slight wear of the anvil body member 30, which, however, is distributed about the entire periphery or circumference thereof. In this connection it is of advantage if the height or width of the cylinder surface 31, as best recognized by referring to FIG. 1, is constructed such that it is somewhat less than the width of the cutting knife.

As clearly shown in the drawing, particularly in FIG. 2, the cutting knife 26 is seated in a slot 28 provided at the the knife support means 24. It will be further observed that the rear portion of this cutting knife 26 does not extend completely down to the floor of the slot 28. The cutting knife 26 is fixed in the slot 28, in the exemplary embodiment, by means of a rivet 29, by way of example. By virtue of this arrangement the cutting knife 26 can move to a slight extent, but with difficulty, with respect to the knife support means 24, and specifically, in the sense of a pivotal movement about the rivet 29, so that the cutting knife edge portion 27 continuously adjusts throughout its entire length to the position of the anvil surface 31. Consequently, manufacturing inaccuracies which might appear or wear effects do not therefore have any disadvantageous effect.

Naturally, it is not an absolute prerequisite of the invention that the anvil surface be formed by a cylindrical surface. On the contrary, arrangements which deviate from the exemplary embodiment of FIGS. 1 and 2 are conceivable and contemplated to be encompassed within the spirit and scope of the invention. For instance, the anvil body member 30 can be constructed to possess a conical configuration and the cutting knife edge portion 27, viewed in FIG. 1, can be ground to possess a correspondingly inclined cutting edge, or else, there can be provided a straight cutting edge which cooperates with a conical anvil body member, which, however, is mounted such that its axis of rotation is appropriately inclined.

Figure 3:
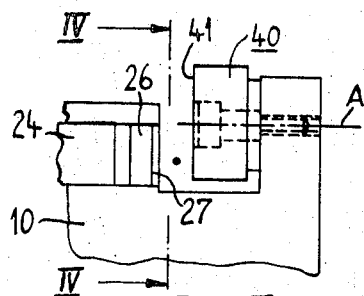
FIG. 3 is a fragmentary front view of a portion of a further embodiment of inventive cutting apparatus, utilizing a modified form of anvil body member.
Figure 4:
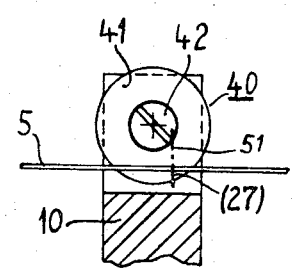
FIG. 4 is a cross-sectional view of the modified form of cutting apparatus shown in FIG. 3, taken along the line IV—IV thereof.

Moreover, the anvil surface can, instead of being formed by the outer or jacket surface of a body of rotation, also be formed by the end surface of a rotatably mounted anvil body member. An embodiment incorporating this concept is illustrated in FIGS. 3 and 4, wherein components which correspond to similar or analogous components of the prior embodiment of FIGS. 1 and 2 have been designated generally with the same reference numerals. In this embodiment, there is provided an anvil body member 40 which is rotatably mounted upon a tight-fit screw 42 or the like at the base plate 10 in such a manner that its end surface 41, providing the anvil surface, is situated opposite the cutting knife 26. In so doing, the strand of material 5 which is to be severed is guided in offset eccentric relation to the center of the axis of rotation A of the anvil body member 40 between the cutting edge 27 and the anvil surface 41, in order to positively insure that during each actuation of the cutting knife 26 there is carried out a rotation movement and a continuous renewal of the effective or operable location of the anvil surface owing to contact with the lengthwise displaced material strand 5. The cutting edge 27 and its momentary point of impact with the anvil surface 41 extends transverse to the material strand 5, for instance is likewise offset with respect to the axis of rotation A of the anvil body member 40, as generally indicated by the chain-dot line 51 of FIG. 4. However, it is here to be mentioned that a mutual positioning of the components of the aforementioned arrangement would be possible so that the momentary cutting line could for instance extend radially with respect to the anvil surface 41.

It should be apparent from the foregoing detailed description, that the objects set forth at the outset to the specification have been successfully achieved.

I claim:

1. An apparatus for cutting a throughpassing lengthwise displaceable strand of material, especially a textile yarn, comprising a displaceably guided cutting knife means having a cutting edge portion, a rotatably mounted anvil body means providing an anvil surface positioned to cooperate with said cutting knife means and its cutting edge portion, said anvil body means being formed of a material possessing less hardness than said cutting edge portion, drive means for advancing said cutting knife means with its cutting edge portion against said anvil surface, said rotatably mounted anvil body means being contacted by the lengthwise displaceable strand of material such that during each cutting operation said anvil body means carries out a partial irregular rotational movement.

2. An apparatus for cutting a throughpassing lengthwise displaceable strand of material, especially a textile yarn, as defined in claim 1, wherein said anvil body means is defined by a body of rotation having a peripheral surface forming said anvil surface, said body of rotation possessing an axis of rotation disposed in the plane of movement of said cutting edge portion of said cutting knife means.

3. An apparatus for cutting a throughpassing lengthwise displaceable strand of material, especially a textile yarn, as defined in claim 2, wherein said body of rotation defining said anvil body means comprises a cylinder having an axis of rotation extending substantially parallel to said cutting edge portion of said cutting knife means.

4. An apparatus for cutting a throughpassing lengthwise displaceable strand of material, especially a textile yarn, as defined in claim 1, wherein said anvil surface of said rotatably mounted anvil body means is defined by an end surface thereof.

5. An apparatus for cutting a throughpassing lengthwise displaceable strand of material, especially a textile yarn, as defined in claim 1, further including support means for supporting said cutting knife means, and means mounting said cutting knife means at said support means so as to be moveable with difficulty relative to said anvil surface for the purpose of accommodating the cutting position of the cutting edge portion of said cutting knife means relative to said anvil surface.

6. An apparatus for cutting a throughpassing lengthwise displaceable strand of material, especially a textile yarn, as defined in claim 1, wherein said anvil body means is rotatable about an axis of rotation, said cutting edge portion of said cutting knife means lying in a plane which is offset with respect to said axis of rotation.